(12) United States Patent  
Schoenfeld

(10) Patent No.: US 8,364,791 B2  
(45) Date of Patent: Jan. 29, 2013

(54) ADAPTING A USER INTERFACE ON A DISPLAY DEVICE OF A PROTOCOL TESTER

(75) Inventor: Christian Schoenfeld, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 2412 days.

(21) Appl. No.: 10/693,423

(22) Filed: Oct. 24, 2003

(65) Prior Publication Data

US 2004/0095391 A1      May 20, 2004

(30) Foreign Application Priority Data

Nov. 15, 2002   (EP) ..................................... 02025494

(51) Int. Cl.
   *G06F 13/00*     (2006.01)
(52) U.S. Cl. ......................... 709/221; 709/224; 718/100
(58) Field of Classification Search .................. 709/220, 709/221, 223, 224; 717/105, 125; 718/100, 718/101
   See application file for complete search history.

(56) References Cited

U.S. PATENT DOCUMENTS

| | | | |
|---|---|---|---|
| 5,619,489 A | | 4/1997 | Chang |
| 5,889,954 A | * | 3/1999 | Gessel et al. .................. 709/223 |
| 6,031,528 A | * | 2/2000 | Langfahl, Jr. ................. 715/734 |
| 6,098,028 A | | 8/2000 | Zwan |
| 6,771,287 B1 | * | 8/2004 | Walker et al. ................. 715/736 |
| 7,010,782 B2 | * | 3/2006 | Narayan et al. ............... 717/124 |
| 2003/0103077 A1 | * | 6/2003 | Despotidis et al. ........... 345/734 |
| 2003/0225876 A1 | * | 12/2003 | Oliver et al. .................. 709/224 |

FOREIGN PATENT DOCUMENTS

| | | |
|---|---|---|
| EP | 1178629 A1 | 2/2002 |
| WO | WO 01/95561 | 12/2001 |

OTHER PUBLICATIONS

"K1297/K1205 Series Protocol Tester, GPRS Software", Sep. 20, 2002, Tektronix, Inc. website: www.tektronix.com/mobile.

EPO, "Communication from the Examining Division," (German language Examination Report received Nov. 2010), regarding EP20020025494, Sep. 29, 2010, 5 pages.

* cited by examiner

*Primary Examiner* — Viet Vu  
(74) *Attorney, Agent, or Firm* — Fogarty, L.L.C.

(57) ABSTRACT

A method for adapting a user interface on a display device of a protocol tester having a visual network plan which is used for the configuration of a telecommunication measurement task by a user includes modifying the visual network plan in comparison to a basic network plan according to hardware and/or software existing in the protocol tester.

14 Claims, 1 Drawing Sheet

ADAPTING A USER INTERFACE ON A DISPLAY DEVICE OF A PROTOCOL TESTER

BACKGROUND OF THE INVENTION

The present invention relates to protocol analysis, and more particularly to adapting a user interface on a display device of a protocol tester.

European Patent Application Serial No. EP 1 128 600 A1 (U.S. Patent Application Pub. No. US 2001/0015732 A1), incorporated herein by reference and assigned to the assignee of the present invention, teaches a method for setting up a communication procedure between instances, one of which is a protocol tester. The instances involved in the communication are selected on a protocol tester, and thereafter a protocol layer is selected on the basis of which the communication between the selected instances is to take place. Further those abstract communication instances of the protocol layer that are involved in the communication are selected and the communication data are determined. On the basis of these selections the protocol tester automatically sets up a communication procedure executable between the instances, i.e., the executable script, with the selection of the abstract communication interfaces or the selection of the communication data being made graphically and with the parameters so selectable being allocated description files, which are used for setting up a communication procedure between the at least two instances. Graphical user interfaces, as are used in the aforementioned EP Application for the configuration of complex information as part of telecommunication measurement tasks, must essentially satisfy the following requirements: easy to understand, easy to control and clearly laid out while showing all configuration parameters and their dependencies. Between these requirements there is a contradiction, the solution of which determines the quality of the user interface. The number of configuration parameters, their possible values and the most diverse complex relationships in-between change when system parameters change, therefore the employment environment or the context are adjusted differently. The context in telecommunication measurement tasks is determined by the interfaces used, the hardware used (Primo or ATM, for example) or the protocol stacks used (WhitBook-ISUP Stack or IP Stack, for example). The prior art, which shows the superset of all possible configuration parameters, does not constitute a satisfactory solution.

What is desired is to simplify the configuration of telecommunication measurement tasks using graphical user interfaces.

BRIEF SUMMARY OF THE INVENTION

Accordingly the present invention provides a method for adapting a user interface on a display device of a protocol tester based on the idea that a graphical user interface may be designed to be more clearly laid out if it is adapted to the current system parameters in each case, particularly the hardware, software, etc. Having a modified visual network plan made available to a user for the configuration of the telecommunication measurement task, with the modification made with respect to the hardware and/or software existing in the protocol tester, the user interface is designed more clearly, and is especially limited to the parameters or elements that may be used with the predetermined equipment of the protocol tester for the configuration of the measurement task. For a context-dependent interface adaptation this resolves the contradiction between the desire for a simple and clearly laid out user interface and the need to be able to enter several configuration parameters. Through limitation of the parameter values actually available for selection, mistakes by the user are avoided.

The visual network plan displayed on a display device is modified according to the selection of the measurement task and/or configuration of the measurement task performed by the user via the user interface. An entry made by the user leads at program run time to a modification of the user interface—to the extent that a new representation is required. The visual network plan is generated by the protocol tester from a text file for describing the graphical user interface. Through the selection of the text file a simple language may be defined that allows a complex graphical user interface to be described with a few text lines. An algorithm for the language of the text files is stored in a storage device. A program queries the entries made by the user up to a relevant point in time and generates therefrom the appropriate text file. Alternatively each user may draft text files for describing user interfaces. It is easy to make the knowledge of persons skilled in the art usable by other users in a simple way. The language makes available different types of objects with the most diverse characteristics. It also is possible to relate different objects to each other. Besides the information for the pure presentation, expert knowledge may be stored for individual configuration parameters. Thus standard values are set so an even less experienced user may modify the corresponding parameters, drawing upon them for the configuration of the measurement task.

The text file contains details on the position of network elements and details on the location of interfaces between the network elements. In view of the simplicity of the representation the text file is correlated with the hardware and/or software equipment of the protocol tester. A suitable text file may be found in two different ways: selected from a predeterminable quantity of text files; or generated by the protocol tester according to the hardware and/or software equipment of the protocol tester. If presentation in the user interface is not suitable, several text files from which to choose may be selected or generated and offered to the user.

In the selection of the text tile or the generation of the text file the inputs of the user are taken into account for specifying the measurement task. Especially after any change made by the user regarding specifying the measurement task, a different text file may, if necessary, be selected or generated. The text file only defines the position and the connections of the elements of the visual network plan, while an interpreter takes into account the hardware and software equipment of the protocol tester in such a way as to mark the elements accordingly for which there is a selection and/or which may be used for the configuration of the measurement task. The latter is preferably determined after switching on the protocol tester by querying corresponding data from a storage device, with the data being written into the storage device by a manufacturer in accordance with the hardware and software equipment of the protocol tester and the data being modified when an upgrade is purchased. The interpreter analyzes the expert knowledge and relates it to the current conditions of the program environment and modifies "on the fly" the user interface generated therefrom. For the user this creates the impression that the user interface dynamically adapts to the current system parameters. Since the suitable text file for the program run time is always interpreted when a new entry is made, any changes to the configuration of the measurement task become visible in the user interface without there being the need to newly generate software system components.

The modification of a basic network plan may affect only a part of the visual network plan being displayed on the display device. The modification may also have elements marked in a predeterminable way, which may be configured with respect to the existing hardware and/or software. The marking for these elements includes the offering of graphic selection possibilities from which the user may choose. The marking also includes for elements which may be configured and/or for which a configuration possibility is acquired and/or for which a configuration possibility is not available a visual presentation in different ways, such as through the use of different colors. This ensures that the user does not define parameters for the configuration of the measurement task which cannot be implemented with the existing hardware and/or software equipment of the protocol tester. Instead information is clearly presented as to which parameters may be defined, which ones may not be defined, and which ones if necessary may be defined by acquiring an upgrade. In this way the protocol tester allows the configuration by the user of only those elements for which the corresponding hardware and/or software equipment exists in the protocol tester. Any measurement task configuration that is not possible at all using the protocol tester is thus reliably avoided.

The objects, advantages and other novel features of the present invention are apparent from the following detailed description when read in conjunction with the appended claims and attached drawing.

DETAILED DESCRIPTION OF THE INVENTION

Figure 1:
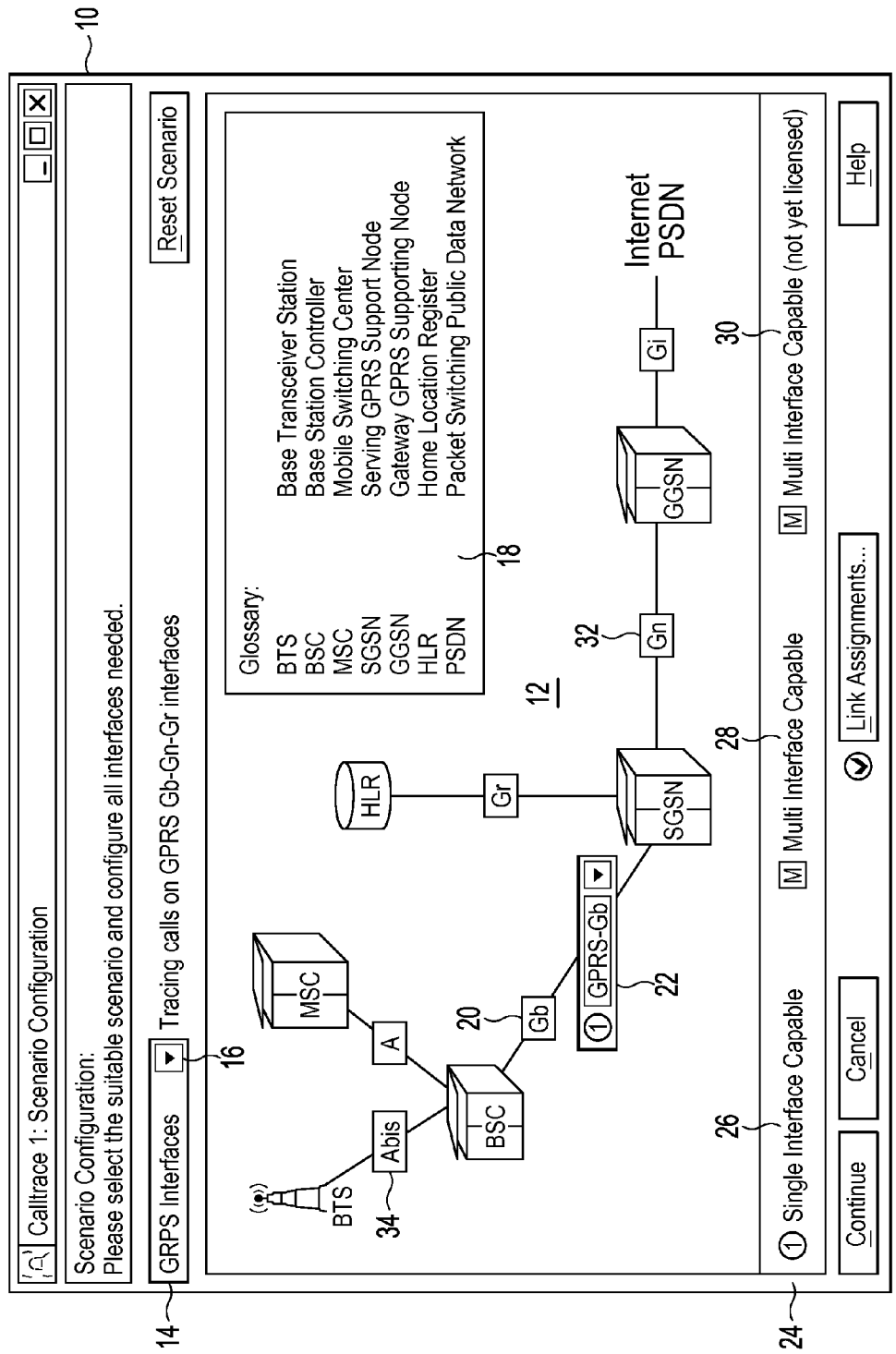
FIG. 1 is a graphic illustration of a visual network plan for an example GPRS network modified according to the hardware and software equipment of a protocol tester according to the present invention.

FIG. 1 shows a graphical user interface 10 of a protocol tester with which a telecommunication measurement task may be configured by a user. Apart from the measurement task "Calltrace" shown, other measurement tasks also may be configured, such as simulation, test, emulation as well as monitoring. Compared with a basic network plan that allows the definition of all measurement tasks in connection with a GPRS network, shown as an example, a visual network plan 12 is modified according to the hardware and/or software equipment of the protocol tester. A first modification reduces the number of network elements shown according to the measurement task. In a selection window 14 the user, by clicking on an icon 16, is offered different measurement tasks that are possible with the protocol tester according to its equipment. In the present example the user has selected the measurement task "Tracing calls on GPRS Gb-Gn-Gr interfaces." The visual network plan 12 shows the elements of a GPRS network that are relevant to this measurement task. For a better understanding the abbreviations used in the visual network plan 12 are explained in another window 18. The protocol tester has found that in the current program environment only the Gb interface 20 is available because for the other interfaces, such as Gn and Gr, no implementations have been installed yet. Therefore using combobox 22 the user configures the Gb interface and indicates in particular at which protocols to execute the measurement task. An unnecessary configuration of Gr or Gn interface is reliably avoided. A line 24 indicates that the measurement task may be executed on a single interface—see detail 26—or on several interfaces—see detail 28. As can be seen from detail 30, detail 28 is not yet licensed, which means it needs to be acquired.

If the user were to activate the Gn interface in another program part, this would be recognized by the protocol tester and a combobox would be offered by the interpreter for the Gn interface 32 on the basis of the same text file. Typical system parameters identified in the search for hardware and software components conducted in the protocol tester include the determination of which network cards are available, which interfaces exist, and which protocol stacks have been configured. Under the prior art ten variants would have been offered to the user for a "CallTrace" measurement task for GPRS interfaces, but in the present invention only two are realizable based on the hardware and software equipment of the protocol tester.

To the extent that several visual network plans are possible with regard to the hardware and software equipment of the protocol tester and/or the configuration of the measurement task by the user, the one selected last or the one for which there are the most or the fewest configuration possibilities is shown first. This may be defined by the user in another program part. A protocol stack is deemed configured when it has been assigned to a corresponding hardware in the protocol tester. Only after a configuration of such a "logical link" is the link recognized by the protocol tester and taken into account for the creation or generation of the text file for the graphical user interface.

In the Annex attached hereto the text file belonging to the visual network plan of FIG. 1 is provided. Line 5 indicates the name which is shown in selection window 14, and the corresponding description is given in line 6. Lines 8 and 9 define the position on the user interface on which the information is displayed. Lines 10-17 concert the first component: line 10 is a heading; line 11 indicates the name of the component; line 12 the place where the graphic symbol is stored; lines 13-16 the position on the user interface; and line 17 the summary to be incorporated into the window 18. The same applies mutatis mutandis to components 2-7 which are described on page 1, line 18 of the Annex to page 2, line 14. Page 2, lines 15-19 give the definition of the first interface. Page 2, line 16 gives the name of the interface. Lines 17 and 18 define between which network elements it is arranged, and line 19 indicates whether or not protocols are available for this. In the present example no protocols are available, which is why no combobox is offered for the Abis interface 34. The same applies mutatis mutandis to the A interface which is defined in lines 20-24 on page 2 of the Annex. For the Gb interface, which is defined on page 2, lines 26-29 protocols are available, with the default setting being the protocol GPRS-Gb MM/SM.

The reason that, although according to the description file protocols are available for the Gr and Gn interfaces, no comboboxes are offered for the corresponding interfaces is: for the Gr and Gn interfaces there are in principle protocols, but they have not been used in the present system configuration. For the user no difference is identifiable in the application example between "not installed" and "not configured." A presentation differentiated to take account of this aspect seems confusing from the user's point of view—what counts in the end is the fact that the Gr and Gn interfaces are not selectable in this situation. The "why" is of secondary importance. If the user uses the protocols for the Gr or Gn interfaces, the corresponding graphic selection possibilities become immediately accessible (enabled) without a new text file having to be generated because the text file is already designed to take account of this circumstance.

Thus the present invention provides a method for adapting a user interface on a display device of a protocol tester having a visual network plan which is used for the configuration of a telecommunication measurement task by a user which includes modifying the visual network plan in comparison to a basic network plan according to hardware and/or software existing in the protocol tester.
Annex:
[Common]
Name=GPRS Interfaces
Description=Tracing calls on GPRS Gb-Gn-Gr Interfaces
  [Glossary]
Show=1
Top=10
  [Component_1]
Name=BTS
Icon=Icons\BTS.bmp
Left=20
Top=10
Width=40
Height=80
Description=Base Transceiver Station
  [Component_2]
Name=BSC
Icon=Icons\BSC.bmp
Left=80
Top=120
Width=40
Height=80
Description=Base Station Controller
  [Component_3]
Name=MSC
Icon=Icons\MSC.bmp
Left=135
Top=20
Width=80
Height=60
Description=Mobile Switching Center
  [Component_4]
Name=SGSN
Icon=Icons\SGSN.bmp
Left=230
Top=230
Width=120
Height=80
Description=Serving GPRS Support Node
  [Component_5]
Name=GGSN
Icon=Icons\GGSN.bmp
Left=440
Top=230
Width=120
Height=80
Description=Gateway GPRS Supporting Node
  [Component_6]
Name=HLR
Icon=Icons\HLR.bmp
Left=250
Top=70
Width=80
Height=30
Description=Home Location Register
  [Component_7]
Name=PSDN
Icon=Icons\PSDN_Internet.bmp
Left=620
Top=230
Width=80
Height=80
Description=Packet Switched Public Data Network
  [Interface_1]
Name=Abis
From=BTS
To=BSC
Protocols=not_available
  [Interface_2]
Name=A
From=BSC
To=MSC
Protocols=not_available
  [Interface_3]
Name=Gb
From=BSC
To=SGSN
Protocols=GPRS-Gb
Default=GPRS-Gb MM/SM
  [Interface_4]
Name=Gr
From=HLR
To=SGSN
Protocols=GPRS-Gr
Default=GPRS-Gr
  [Interface_5]
Name=Gn
From=SGSN
To=GGSN
Protocols=GPRS-Gn
Default=GPRS-Gn GTP SMG
  [Interface_6]
Name=Gi
From=GGSN
To=PSDN
Protocols=not_available

What is claimed is:

1. A method of adapting a user interface on a display device of a protocol tester having a visual network plan which is used for the configuration of a telecommunication measurement task by a user comprising:
  generating the visual network plan by the protocol tester from a text file for a description of a graphical user interface; and
  modifying the visual network plan on the display device in comparison to a basic network plan according to which hardware and/or software exists in the protocol tester;
  wherein the text file only defines the position and connections of elements of the visual network plan while an interpreter marks the elements for which a selection exists and/or which may be used for the configuration of the telecommunication measurement task according to the hardware and/or software of the protocol tester.

2. The method according to claim 1 wherein the modifying step further comprises the step of modifying the visual network plan according to a selection made by the user via the user interface of the telecommunication measurement task and/or the configuration of the measurement task.

3. The method according to claim 1 wherein the text file comprises information on the position of network elements and on the location of interfaces between the network elements.

4. The method according to claim 1 further comprising the step of correlating the text file with the hardware and/or software in the protocol tester.

5. The method according to claim 4 further comprising the step of selecting the text file from a predeterminable quantity of text files.

6. The method according to claim 4 further comprising the step of generating the text file by the protocol tester according to the hardware and/or software of the protocol tester.

7. The method according to claim 5 further comprising the steps of:
   selecting or generating several text files according to the hardware and/or software of the protocol tester; and
   offering the several text files to the user for selection.

8. The method according to claim 5 wherein the selecting step comprises the step of taking into account entries made by the user for specifying the telecommunication measurement task.

9. The method according to claim 8 further comprising the step of selecting or generating another text file if necessary after a change of the specification of the measurement task is made by the user.

10. The method according to claim 1 or 2 further comprising the step of showing on the display device as the visual network plan only a part of the basic network plan being modified.

11. The method according to claim 10 further comprising the step of marking in a predeterminable way in response to the modifying step those elements which may be configured according to the hardware and/or software of the protocol tester.

12. The method according to claim 11 wherein the marking step comprises the step of offering graphic selection methods for those elements from which the user selects.

13. The method according to claim 11 wherein the marking step comprises the step of visually presenting in different ways those elements which may be configured and other elements for which no configuration is possible.

14. The method as recited in claim 13 wherein the different ways comprise different colors.

* * * * *